(12) United States Patent
Ohta et al.

(10) Patent No.: US 8,267,356 B2
(45) Date of Patent: Sep. 18, 2012

(54) TENSION BALANCER

(75) Inventors: Atsushi Ohta, Sakata (JP); Masanobu Takahashi, Sakata (JP); Shinichi Kobayashi, Sakata (JP); Mikio Ito, Sakata (JP); Mitsuru Murakami, Sakata (JP); Yutaro Ohtomo, Sakata (JP); Keitaro Kawamura, Sakata (JP); Masahashi Nakagome, Sakata (JP)

(73) Assignee: NHK Spring Co., Ltd, Yokohama-shi, Kanagawa (JP)

( * ) Notice: Subject to any disclaimer, the term of this patent is extended or adjusted under 35 U.S.C. 154(b) by 283 days.

(21) Appl. No.: 12/680,129

(22) PCT Filed: Dec. 5, 2008

(86) PCT No.: PCT/JP2008/072137
§ 371 (c)(1),
(2), (4) Date: May 13, 2010

(87) PCT Pub. No.: WO2009/072595
PCT Pub. Date: Jun. 11, 2009

(65) Prior Publication Data
US 2010/0243825 A1 Sep. 30, 2010

(30) Foreign Application Priority Data
Dec. 6, 2007 (JP) .................. 2007-315457

(51) Int. Cl.
*F16L 3/08* (2006.01)
(52) U.S. Cl. .......... 248/65; 248/566; 248/576; 248/619; 267/73; 174/40 TD (58) Field of Classification Search .................. 248/566, 248/577, 578, 594, 597, 636, 655, 658, 65, 248/573, 576, 618, 619; 174/40 TD; 267/73, 267/64.25; 285/13, 73, 64.25, 71
See application file for complete search history.

(56) References Cited

U.S. PATENT DOCUMENTS
6,378,848 B1 * 4/2002 Uchida et al. .............. 267/64.25
(Continued)

FOREIGN PATENT DOCUMENTS
JP         36-17506 B2     7/1961
(Continued)

*Primary Examiner* — Tan Le
(74) *Attorney, Agent, or Firm* — Nixon Peabody LLP; Jeffrey L. Costellia (57) ABSTRACT

A tension balancer which includes an axis body including a latch part, a column shaped main body including a bottom part which has at least two first through holes arranged at equal intervals in a concentric circle from the center, and an open upper part, a spring base housed within the main body and having an aperture for joining an end of the axis body to the center, and at least two second holes arranged at equal intervals in a concentric circle from the center, an upper lid having an aperture for pushing through the main body of the axis body to the center, and at last two second through holes arranged at equal intervals in a concentric circle from the center, the upper lid being screwed to the main body by a bold and nut which passes through the first, second and third through holes, and at least two or more spring unit groups sandwiched between the spring base which is housed within the main body and the upper lid.

18 Claims, 10 Drawing Sheets

U.S. PATENT DOCUMENTS

| | | | |
|---|---|---|---|
| 2010/0243825 A1* | 9/2010 | Ohta et al. | 248/65 |
| 2010/0289196 A1* | 11/2010 | Kimura | 267/73 |
| 2011/0089618 A1* | 4/2011 | Kimura | 267/73 |
| 2011/0253443 A1* | 10/2011 | Sasa | 174/40 TD |

FOREIGN PATENT DOCUMENTS

| | | | |
|---|---|---|---|
| JP | 58-3516 A | | 1/1983 |
| JP | 63-105421 U | | 7/1988 |
| JP | 2-30224 U | | 2/1990 |
| JP | 9-33201 | * | 2/1992 |
| JP | 9-207629 | * | 8/1997 |
| JP | 11-48834 | * | 2/1999 |
| JP | 2000-158981 A | | 6/2000 |
| JP | 2003-348723 | * | 12/2003 |
| JP | 2004-036770 A | | 2/2004 |
| JP | 2009-296795 | * | 12/2009 |

* cited by examiner

The power line tension balancer related to one embodiment of the present invention is not installed.

The power line tension balancer related to one embodiment of the present invention is installed.

PRIOR ART

Fig.10

PRIOR ART

TENSION BALANCER

CROSS REFERENCE TO RELATED APPLICATIONS

This application is based upon and claims the benefit of priority from the prior Japanese Patent Application No. 2007-315457, filed on Dec. 6, 2007, and PCT Application No. PCT/JP2008/072137, filed on Dec. 5, 2008, the entire contents of which are incorporated herein by reference.

BACKGROUND OF THE INVENTION

1. Technical Field

The present invention is related to a tension balancer for supporting the tension of a substation facility power cable etc.

2. Description of the Related Art

Figure 9:
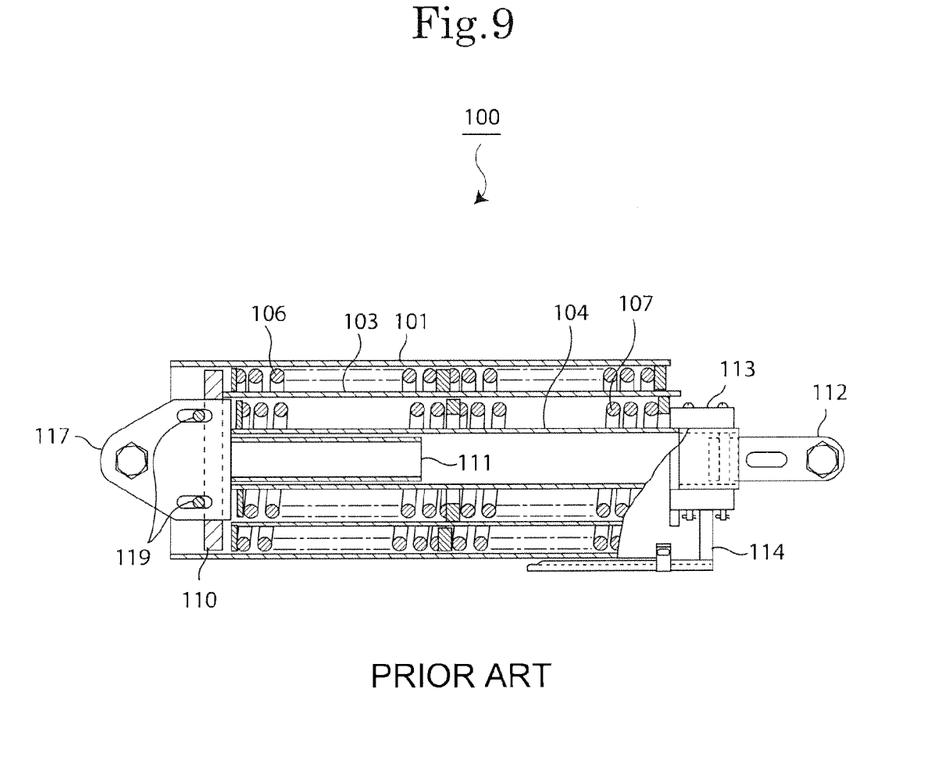
FIG. 9 is a cross sectional diagram which shows the structure of a general train power cable tension balancer.
Figure 10:
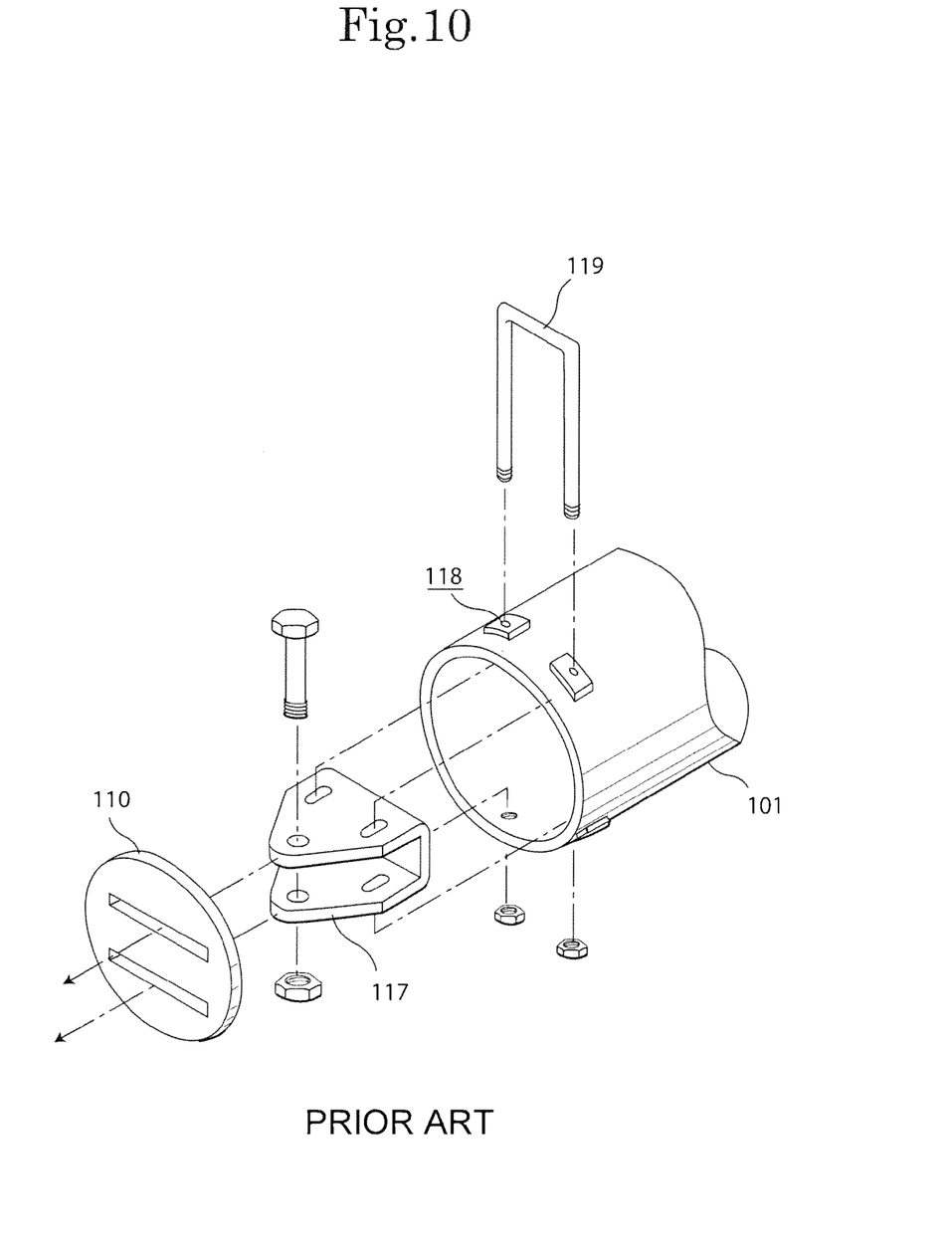
FIG. 10 is an approximate schematic diagram of a pillar side connection part of the train power cable tension balancer shown in FIG. 9.

A power cable (bus line) 3 in substation facilities is elevated by a fixed tension between two steel structures 2. The tension at this time is generally a high tension of around 500 kgf. Therefore, breaks in the elevated wire due to shaking caused by earthquakes, transformation of the shape of steel structure parts and damage to dead-end insulators may be generated in the bus line 3 which does not take up any extra tension. Here, a tension balancer is provided as a device for stabilizing the state of a high tension. Although not used in substation facilities, a general tension balancer (For example, refer to Japanese Laid Open Patent 2000-158981) which is used for supporting the tension of elevated train cables (referred to as train cables below), is explained based on the diagrams. FIG. 9 shows the structure of a general train cable tension balancer 100 used for supporting the tension of train cables. In addition, FIG. 10 is an approximate schematic diagram of a pillar side connection part of the train cable tension balancer 100.

The train power cable tension balancer 100 is arranged with a plurality of telescopic inner pipes 103, and because stroke movement of the plurality of inner pipes 101 is produced when an extra tension is applied, a sufficient setting space is required.

In addition, the train power cable tension balancer 100 is arranged between a train power cable pillar and a train power cable and is used for supporting a specific tension. Here, because a train power cable is elevated outside, it receives the effects of wind etc. In strong winds, the train power cable is sometimes twisted. In this case, this twisting is transferred to the train power cable tension balancer 100 and the inner pipe 103 or hollow rod 104 within the train power cable tension balancer 100 are rotated. In order to prevent this rotation, a part such as a block shaped stopper 113 is required. In the case where this part is not arranged, the twisting of the train power cable is transferred to the rotation of the inner pipe 103 and it is no longer possible to stop the twisting of the train power cable. In order to stop the twisting, a rotation prevention part is required on each of the plurality of inner pipes 103 which are arranged in a telescopic shape resulting in an increase in costs and complex assembly.

BRIEF SUMMARY OF THE INVENTION

The train power cable tension balancer has a structure appropriate for a train power cable and an obstacle is produced in order to be used in a substation facility which does not have any leeway between an electric power transmission steel structure and power cable. In addition, although it is necessary to fix a pillar side fixing member 117 to a casing 101, as is shown in FIG. 9, because the pillar side fixing member 117 is inserted into the casing 101 which is arranged with a plurality of telescopic shaped inner pipes 103 and fixed by a U shaped bolt 119, assembly becomes complex and costs increase. In addition, a plurality of coil springs are arranged, however, each coil spring has a one to one relationship with each of the plurality of inner pipes 103 and because they are arranged in series they can not withstand a high tension. As stated above, it is difficult to use a general train power cable tension balancer unmodified in a power cable and obstacles are produced when installed. Thus, the present invention was arrived at after repeated research.

A goal of the present invention is to provide a power cable tension balancer which is small in size, has a small setting space and is easily assembled and can support a high tension. In addition, a goal of the present invention is to provide a tension balancer which can prevent twisting of an elevated cable simply by tension adjustment.

A feature of one embodiment of the present invention is a tension balancer which includes an axis body including a latch part, a column shaped main body including a bottom part which has at least two first through holes arranged at equal intervals in a concentric circle from the center, and an open upper part, a spring base housed within the main body and having an aperture for joining an end of the axis body to the center, and at least two second through holes arranged at equal intervals in a concentric circle from the center, an upper lid having an aperture for pushing through the main body of the axis body to the center, and at last two third through holes arranged at equal intervals in a concentric circle from the center, the upper lid being screwed to the main body by a bolt and nut which passes through the first, second and third through holes, and at least two or more spring unit groups sandwiched between the spring base which is housed within the main body and the upper lid. With this structure, a small size and easily assembled tension balancer is provided which can support a high tension.

According to the present invention, a power cable tension balancer is provided which is small in size, has a small setting space and is easily assembled and can support a high tension. In addition, a tension balancer is provided which can prevent twisting of an elevated cable simply by tension adjustment.

DETAILED DESCRIPTION OF THE INVENTION

[Structure of a Tension Balancer Related to the Present Invention]

An example where a tension balancer 1 related to one embodiment of the present invention is used in a power cable (that is, an example of a power cable tension balancer) will be explained in detail below while referring to FIG. 1 to FIG. 6. Furthermore, the present invention is not limited to the embodiments below. In addition, in the embodiments, the same structural elements have the same reference symbols and therefore overlapping explanations may be omitted.

Figure 1:
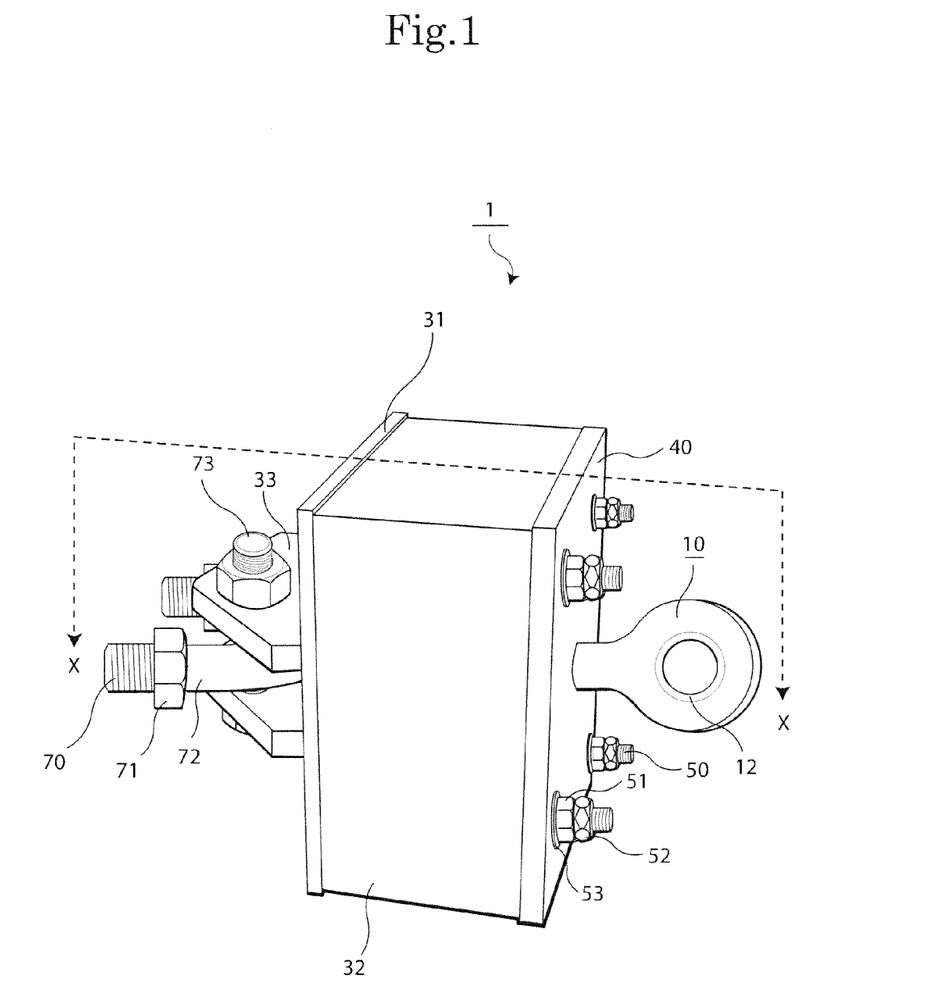
FIG. 1 is an approximate schematic diagram of a power cable tension balancer related to one embodiment of the present invention.
Figure 2:
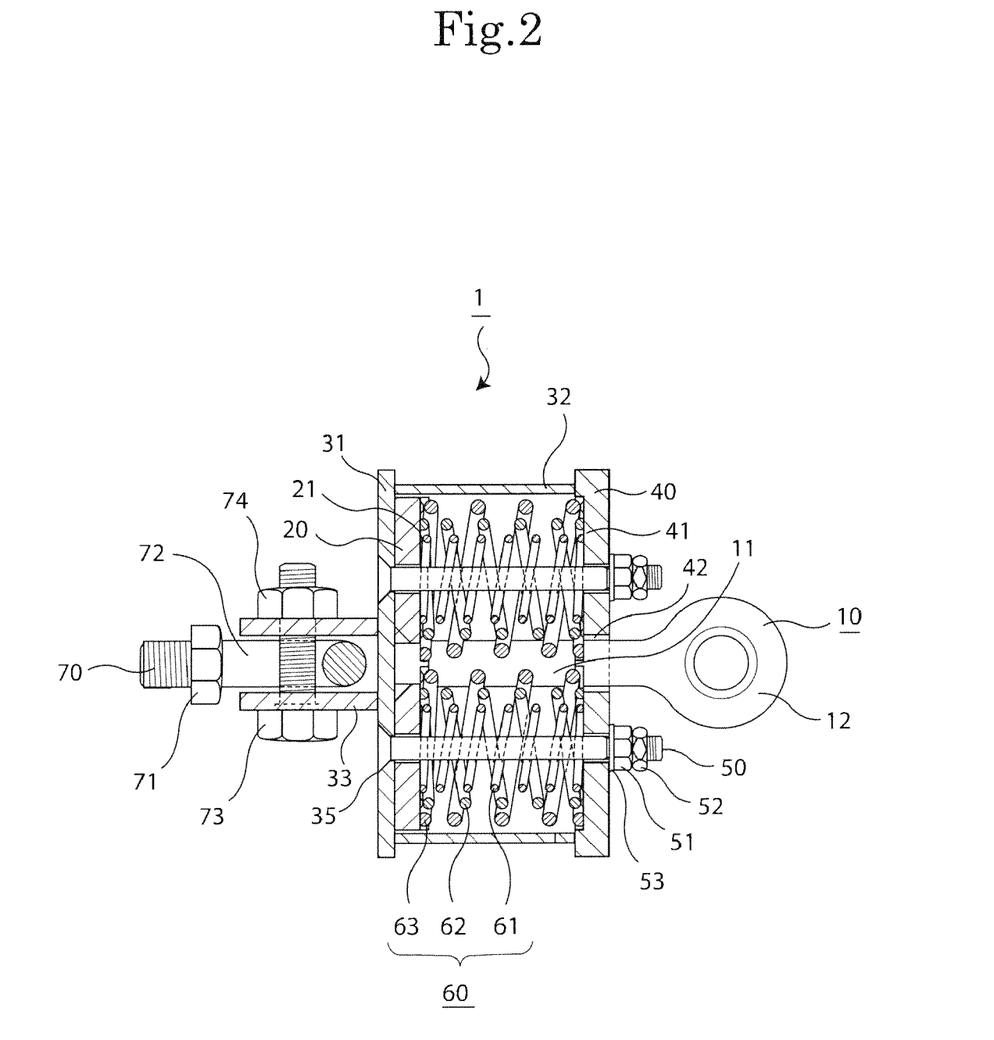
FIG. 2 is a partial cross sectional diagram of the power cable tension balancer related to one embodiment of the present invention.
Figure 3:
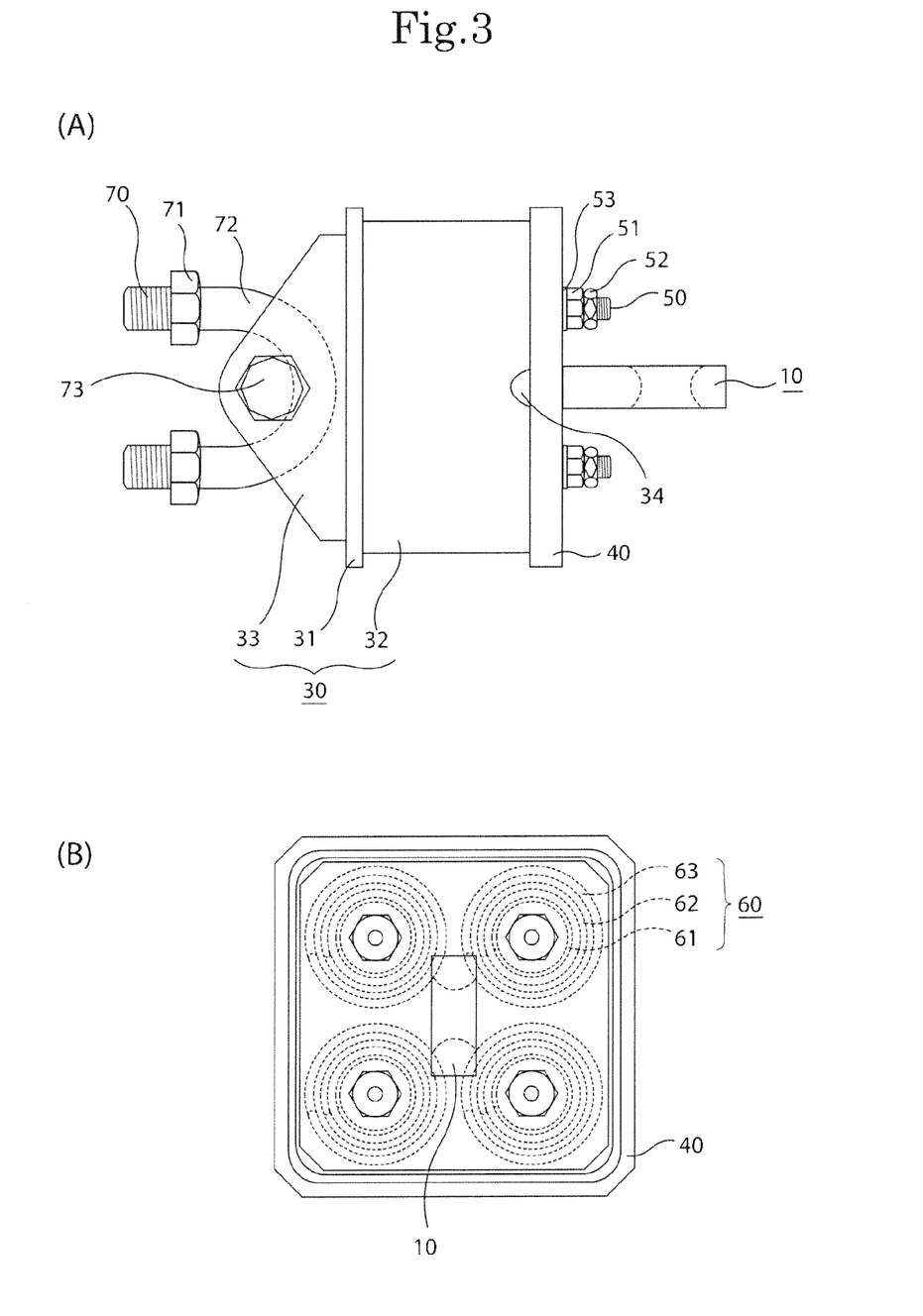
FIG. 3 is a bottom side view and front side view diagram of the power cable tension balancer related to one embodiment of the present invention.

FIG. 1 is an approximate schematic diagram of a power cable tension balancer related to one embodiment of the present invention. FIG. 2 is a partial cross sectional diagram between X-X shown in FIG. 1. FIG. 3 is a bottom side view and front side view diagram of the power cable tension balancer related to one embodiment of the present invention and FIG. 3 (A) is a lower part planar view and FIG. 3 (B) is a front part planar view. As is shown in FIG. 1 to FIG. 3, the power cable tension balancer 1 related to one embodiment of the present invention is approximately formed by an axis body 10, a main body case 30, an upper lid 40, and a spring base 20 and spring unit 60 which are housed within the main body case 30. The main body case 30 and the upper lid 40 are sandwiched by a bolt 50, two large and small nuts (double nuts) 51, 52 and a flat washer 53.

The main body case 30 includes a shackle shaped installation part 33 at the bottom part of the case. A through hole is arranged which allows the bolt 73 to pass through the center of the installation part 33. In the power cable tension balancer 1, a U shaped bolt 72 which is attached by a bolt 71 to both ends of a wire 70 which is wound around the pillar of a steel structure 2 or the U shaped bolt 72 which is attached to a steel structure installation part 6, is inserted into the installation part 33 and the bolt 73 passes through the through hole and is fixed to the pillar. The through hole of the installation part 33 is used for allowing this fixing bolt to pass through.

The power cable tension balancer 1 related to the present embodiment which has this structure will be explained in more detail while referring to FIG. 2 and FIG. 3. First, the main body case 30 is explained. The main body case 30 is roughly comprised of a case bottom part 31, a case side part 32 and an installation part 33, and is a pillar shaped case having a cross sectional shape formed from n squares (n is a natural number of 3 or more) or ellipses and open upper part. The case bottom part 31 is comprised of steel and includes a bolt through hole 35 (sometimes referred to as a first through hole herein after) at a certain position, and is a flat plate with each corner part being cut into roughly n squares (n is a natural number of 3 or more) or ellipses. In the present embodiment, a general structure rolled steel SS400 is used and has a square shape. In addition, there are at least two bolt through holes 35 which are arranged at equal intervals in a concentric circle from the center of the case bottom part 31. In the present embodiment, four bolt through holes 35 are arranged at equal intervals. In the present invention, because a flat head bolt is used as the bolt 50, the bolt through holes 35 have an open taper shape expanding from the inner side (side from which the case side part 32 is installed) towards the outer side (side which the installation part 33 is installed).

Two shackle shaped installation parts 33 are arranged in parallel at certain positions on one side of the case bottom part 31. A through hole is arranged at each of these positions as stated above. As is shown in FIG. 3 (A), in the case where the power cable tension balancer is installed on a fixing object, the U shaped bolt 72 connected to the wire 70 and fixed by the nut 71 is fixed by latching using the bolt 73 which is passed through the through hole.

A case side part 32 comprised of a pipe is arranged on another side of the case bottom part 31 wherein both ends of the pipe are open and have a smaller diameter than the length of one edge of the case bottom part 31 and a cross sectional shape formed from n squares (n is a natural number of 3 or more) or ellipses. In the present embodiment, a square pillar corner pipe comprised of a general structure square shaped steel pipe is used according to the shape of the case bottom part 31. The case side part 32 is joined to the case bottom part 31 by brazing or welding. Furthermore, a semicircular notch is arranged on an end side (upper part side) of one side (the lower side at the stage of manufacture) among the four sides of the case side part 32, as is shown in FIG. 3 (A). This notch is a water drainage hole 34 for discharging built up rain water etc within the main body case 30.

Figure 4:
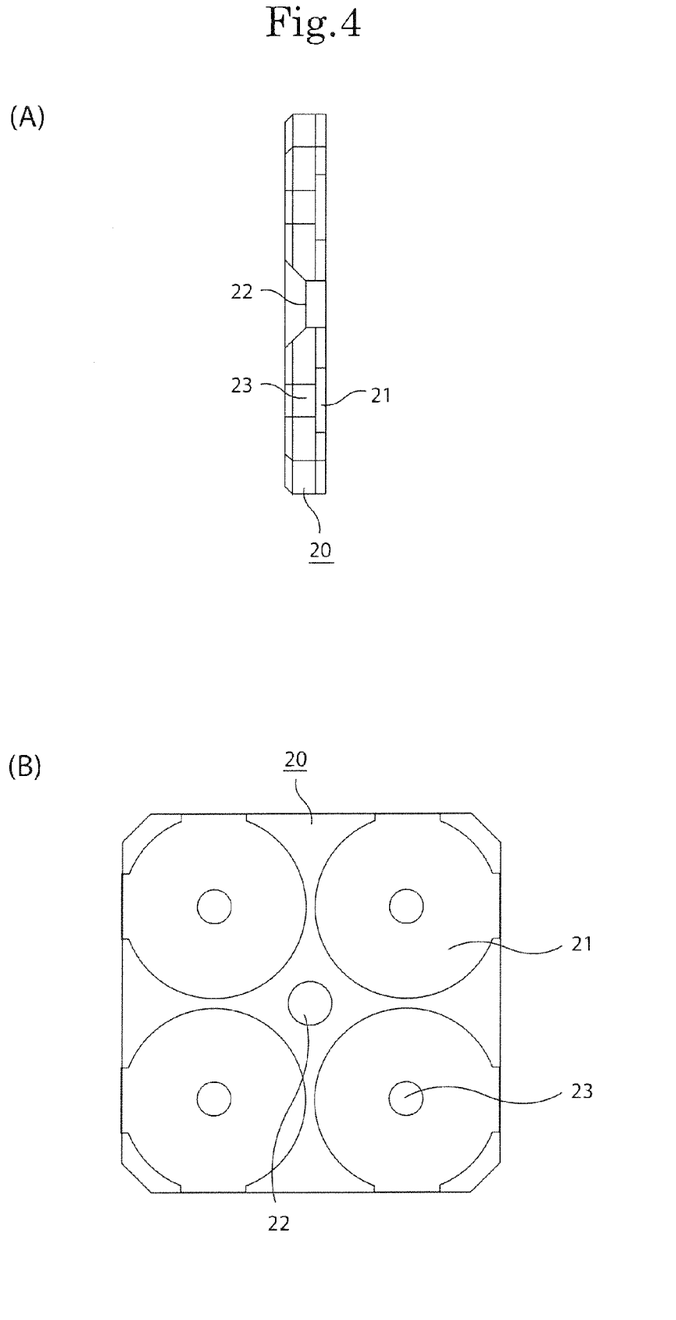
FIG. 4 is an approximate schematic diagram of a spring base of the power cable tension balancer related to one embodiment of the present invention.

As is shown in FIG. 2, a spring base 20 is housed within the interior of the main body case 30. The spring base 20 is explained using the diagrams. FIG. 4 is an approximate schematic diagram of a spring base of the power cable tension balancer related to one embodiment of the present invention, FIG. 4 (A) is a cross sectional view and FIG. 4 (B) is a planar view. As is shown in FIG. 4, the spring base 20 is arranged with through holes at certain positions at the center and in a concentric circle from the center and the spring base 20 is a flat plate comprised of steel and has a cross sectional shape of n squares (n is a natural number of 3 or more) or ellipses. In the present embodiment, a square general structure rolled steel SS400 is used. The shape is set to match the main body case 30.

As is shown in FIG. 4 (B), the hole arranged at the center of the spring base 20 is for inserting an end part of a main body 11 of an axis body 10 and herein after is called axis body insertion hole 22. The axis body insertion hole 22 is formed in a taper shaper up to a certain position from the exterior side towards the interior side (from the left side to the right side in FIG. 4 (A)). That is, the axis body insertion hole 22 is formed at the same diameter from the interior side up to a certain position and expands from this certain position in an exterior direction. This is to ensure that a brazing filler material is easily injected and for securing ease in processing when brazing or welding after inserting the axis body 10 into the axis body insertion hole 22. In addition, the through hole which is arranged at a certain position in a concentric circle from the center is for allowing the bolt 50 which screws the upper lid 40 to the main body case 30 to pass through and is called bolt through hole 23 herein after (or second through hole). In the present embodiment, four bolt through holes 23 are arranged at equal intervals in a concentric circle and the diameter of the bolt through hole 23 is set according to the diameter of the bolt 50. In addition, the position where the bolt through hole 23 is arranged is set in a position coaxially with a bolt through hole 35 set in the case bottom part 31 in the case where the spring base 20 is housed in the main body case 30.

A concave round shaped base spring unit housing part 21 (below sometimes called a first housing part) is formed at a certain position on the interior of the spring base 20 (right side facing FIG. 4 (A), upper lid 40 side in a state housed in the main body case 30) and is a depression for housing an end of a spring unit 60. The number of base spring unit housing parts 21 is formed according to the number of spring units 60 which are arranged. Therefore, four are arranged in the present embodiment. In addition, the diameter of the base spring unit housing part 21 is set larger than the exterior diameter of the spring unit 60 and therefore, the end of the spring unit 60 is housed in the base spring unit housing part 21 and does not move left or right. Furthermore, in the present embodiment, the center of the base spring unit housing part 21 matches the center of the above stated bolt through hole 23. Therefore, the bolt 50 passes through the center of the spring unit 60 which is housed by the base spring unit housing part 21. However, it is not limited to this, the number of base spring unit housing parts 21 and the number of bolt through holes 23 may be different.

Figure 5:
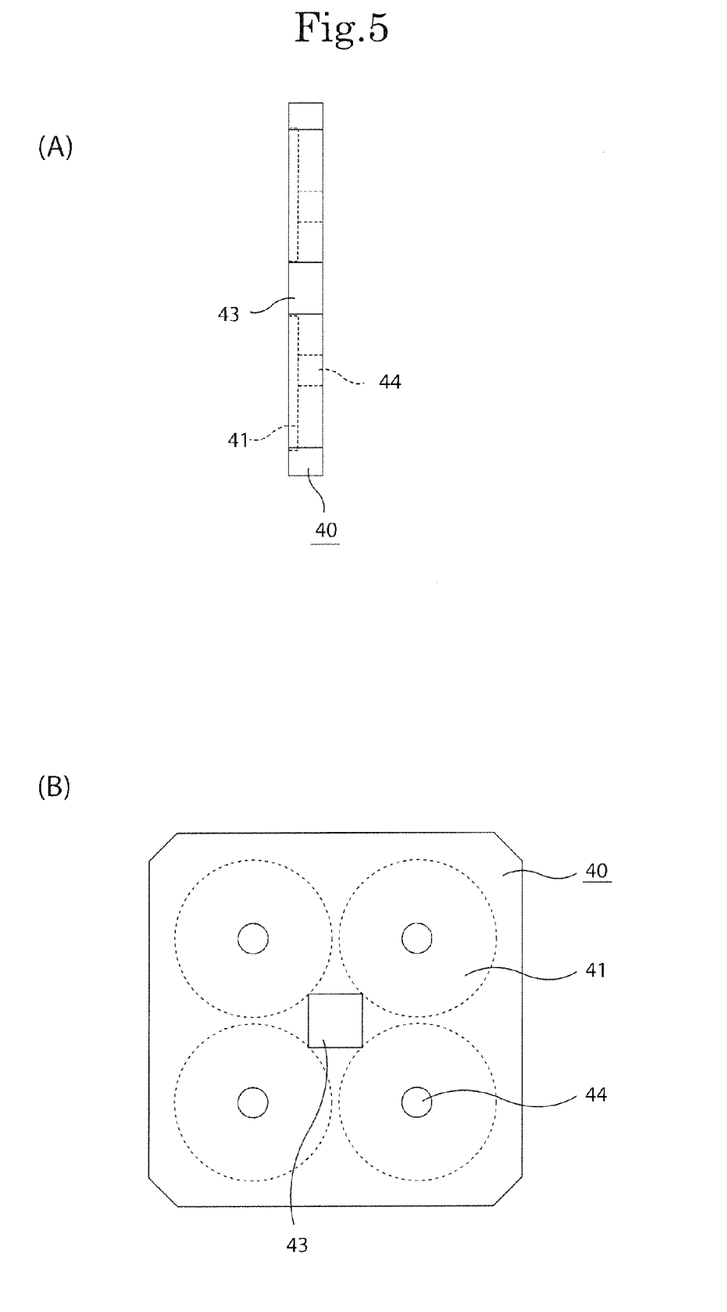
FIG. 5 is an approximate schematic diagram of an upper lid of the power cable tension balancer related to one embodiment of the present invention.

As is shown in FIG. 2, the main body case 30 is covered by the upper lid 40 and screwed closed by the bolt 50. Next, the upper lid 40 is explained in detail using FIG. 5. FIG. 5 is an approximate schematic diagram of an upper lid of the power cable tension balancer related to one embodiment of the present invention, FIG. 5 (A) is a cross sectional view and FIG. 5 (B) is a planar view. As is shown in FIG. 5 (B), the upper lid 40 is arranged with a through hole at the center and at certain positions in a concentric circle from the center, and is a plate which is forming by steel and has a cross sectional shape of n squares (n is a natural number of 3 more) or ellipses. In the present embodiment, a square general structure rolled steel SS400 is used. The shape is set to match the main body case 30.

The length of one edge of the upper lid 40 is set larger than the length of one edge a cross section of a square of the side part 32 of the main body case 30. Therefore, in the case where the upper lid 40 is attached to the upper part of the main body case 30, the upper lid 40 covers the aperture of the end of the side part 32 of the main body case 30.

The hole arranged at the center of the upper lid 40 is for inserting the main body 11 of the axis body 10 and below is referred to as axis body through hole 43. So that there is no obstacle to the movement of the axis body 10 which is inserted, the diameter of the axis body through hole 43 is set larger than the diameter of the main body 11 of the axis body 10. In addition, in the present embodiment, the axis body through hole 43 is formed in a rectangular shape. This is for matching with the cross sectional shape of the main body 11 of the axis body 10 which is passed through. However, it is not limited to this. If the cross sectional shape of the main body 11 of the axis body 10 is a round shape, the axis body through hole 43 may also be a round shape. In addition, the shape may also be different to the shape of the main body 11 of the axis body 10.

The through hole arranged at a certain position in a concentric circle from the center is a hole for allowing the bolt 50 which screws closed the main body case 30 with the upper lid 40 to pass through the same as the second through hole 23 and the first through hole 35 arranged on the case bottom part 31 and the spring base 20, and is called a bolt through hole 44 herein after (or sometimes called third through hole). In the present embodiment, four bolt through holes 44 are arranged at equal intervals in a concentric circle and the diameter of the bolt through holes 44 is set according to the diameter of the bolt 50. The position in which the bolt through holes 44 are arranged is set coaxially with the bolt through hole 35 of the case bottom part 31 and the bolt through hole 23 which is arranged on the spring base 20 housed within the main body case 30, in the case where the upper lid 40 is attached to the main body case 30. Therefore, the number of bolt through holes 44 is the same as the number of bolt through holes 35 and 23.

The same as the spring base 20 stated above, a concave round shaped upper lid spring unit housing part 41 (below sometimes called a second housing part) is formed at a certain position on the inner side (the side which contacts with the main body case 30, left side facing FIG. 5) of the upper lid 40 and is a depression for housing an end of a spring unit 60. The number of upper lid spring unit housing parts 41 is formed according to the number of spring units 60 which are arranged. Therefore, four are arranged in the present embodiment. In addition, the diameter of the upper lid spring unit housing part 41 is set larger than the exterior diameter of the spring unit 60 and therefore, the end of the spring unit 60 is housed in the upper lid spring unit housing part 41 and does not move left or right. Furthermore, in the present embodiment, the center of the upper spring unit housing part 41 matches the center of the above stated bolt through hole 44. Therefore, the bolt 50 passes through the center of the spring unit 60 which is housed by the upper lid spring unit housing part 41.

As is shown in FIG. 2, an axis body 10 is arranged in order to connect the above stated upper lid 40 and the spring base 20. The axis body 10 is formed from a rod shaped main body 11 which has a rectangular cross sectional shape in a direction intersecting a length direction, and a roughly circular axis body stopper part 41 which has a round aperture at it's central part.

Figure 6:
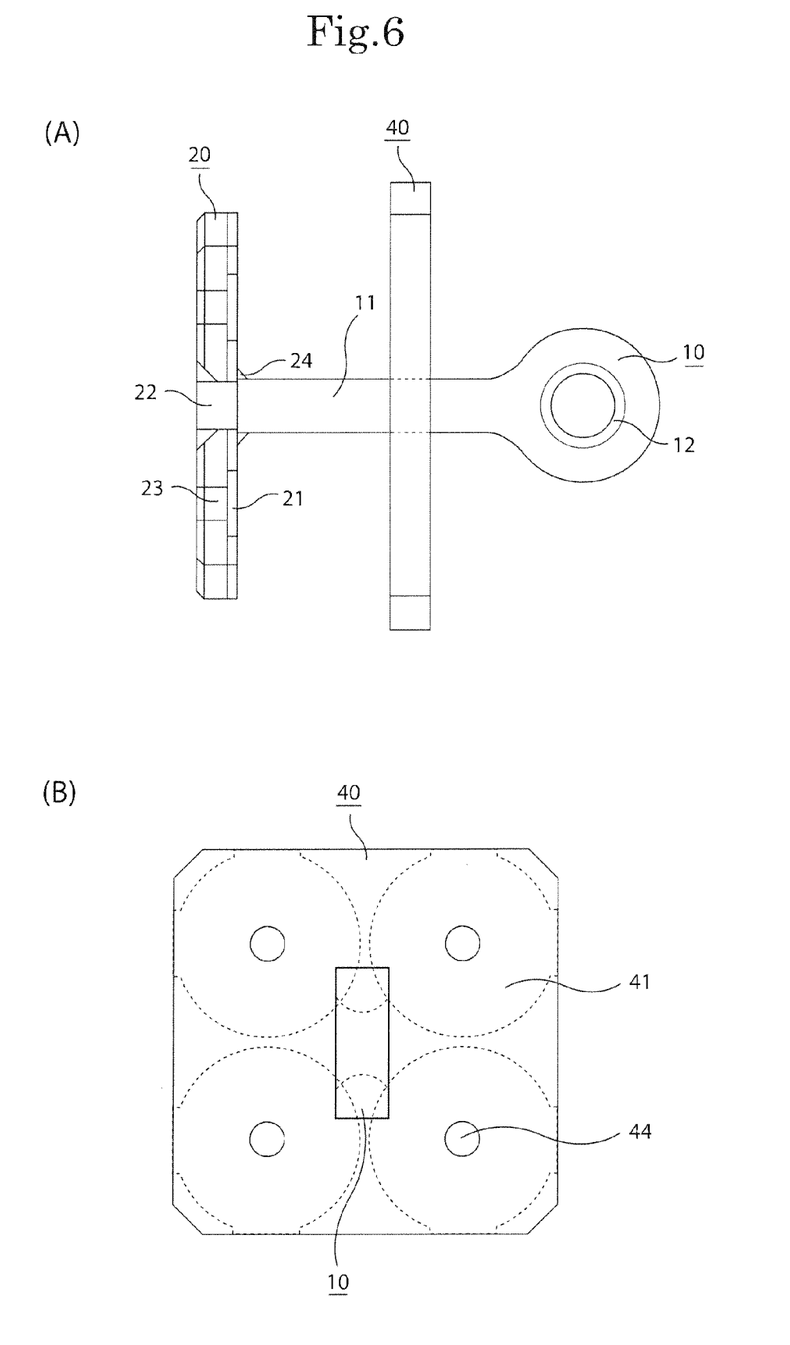
FIG. 6 is an approximate schematic diagram which shows the connection relationship between the spring base, the upper lid and an axis body of the power cable tension balancer related to one embodiment of the present invention.

The connection state of the spring base 20, upper lid 40 and axis body 10 will, be explained based on FIG. 6. FIG. 6 is an approximate schematic diagram which shows the connection relationship between the spring base 20, the upper lid 40 and the axis body 10 of the power cable tension balancer related to one embodiment of the present invention, FIG. 6 (A) is a cross sectional view and FIG. 6 (B) is a front planar view. As is shown in FIG. 6 (A), the end of the axis body 10 which is passed through the axis body insertion hole 43 from the exterior side (right side, facing FIG. 6. Side on which the second housing part 41 is not formed) is inserted into the axis body through hole 43 from the inner side of the spring base 20 (right side, facing FIG. 6. Side on which the first housing part 21 is formed), joined by brazing or welding in a joining part 24 and fixed to the spring base 20. Therefore, in this state, the upper lid 40 is in a slidable state along the main body 11 of the axis body 10 between the axis body stopper part 12 and the spring base 20 which is joined to the axis body 10. As is shown in FIG. 6 (B) it can be seen that the axis body 10 is inserted into the upper lid 40 when viewed from the front (exterior of upper lid 40).

As is shown in FIG. 2, in the power cable tension balancer 1 related to the present embodiment, the spring unit 60 is arranged between the spring base 20 which is fixed to the axis body 10 by brazing or welding and the upper lid 40 through which the axis body 10 passes. The spring unit 60 is formed by m (m is a natural number of 2 or more) coil springs. In the present embodiment, three coil springs form one spring unit group, but the number of coil springs is not limited to three. The number of coil springs may be increased or decreased according to the tension of the power cable 3. M coil springs are combined in a nesting shape to form one spring unit group 60. That is, a plurality of springs is arranged in parallel. At this time, adjacent coil springs are arranged so that each winding direction is respectively different. In the present embodiment, of the three coil springs, the second biggest middle spring 62 is arranged on the interior of the largest outside spring 63, and the smallest inside spring 61 is arranged on the interior of the middle spring 62. In the present embodiment, the outside spring 63 and the inside spring 61 are wound dextrally and the middle spring 62 is wound sinistrally. However, the winding direction is not limited to this. For example, the winding direction of adjacent coil springs may also be the same.

The spring unit 60 is arranged between the spring base 20 and the upper lid 40 which is slidably arranged along the axis body 10 joined with the spring base 20. The upper lid 40 is slid to a maximum in the direction of the stopper part 12 of the axis body 10, the interval between the spring base 20 and the upper lid 40 is opened to its maximum, and the spring unit 60 is inserted into the interval from a horizontal direction in a compressed state. After insertion, the spring unit 60 is stretched by a rebound force, one end of the of spring unit 60 is housed by the first housing part 21 of the spring base 20, and the other end of the spring unit 60 is housed by the second housing part 41 of the upper lid 40. Because the first housing part 21 and the second housing part 41 have a concave shape, both ends of the spring unit 60 are sandwiched by the first housing part 21 and the second housing part 41, and do not move left or right. Therefore, it is not necessary to join the spring unit 60 by brazing or welding and assembly of the power cable tension balancer 1 related to the present embodiment is easy.

After a certain number of spring units 60 are arranged, the spring base 20 which is linked with the upper lid 40 and axis body 10 is housed within the main body case 30. At this time, the spring base 20 is housed within the main body case 30 so that two installation parts 33 are joined in parallel to the bottom part 31 of the main body case 30 by brazing or welding and an aperture of the stopper part 12 of the axis body 10 which is joined to the spring base 20 by brazing or welding are positioned in intersecting directions. In this way, when the power cable tension balancer 1 is arranged, a wire 70 of the steel structure 2 side and a hook of an insulator 5 (not shown in the diagram) of the power cable 3 side which is latched by the axis body stopper part 12 become straight and the power cable tension balancer 1 can be arranged without twisting being produced. In a state in which the spring base 20 which is linked with the axis body 10 and the upper lid 40 are housed within the main body case 30, the bolt through hole 35 of the main body case 30, the bolt through hole 23 of the spring base 20 and the bolt through hole 43 of the upper lid 40 are coaxially arranged in parallel respectively.

After the spring base 20 which is linked with the axis body 10 and the upper lid 40 are housed in the main body case 30, the bolt 50 is inserted into the bolt through hole 35 from the bottom part 31 side of the main body case 30. Because the bolt through hole 35, bolt through hole 23 and bolt through hole 43 are coaxially positioned, the bolt 50 passes through the main body case 30, the spring base 20 and the upper lid 40, and projects to the exterior of the upper lid 40. A flat washer is inserted over an end of the projecting bolt 50 and the main body case 30 and upper lid 40 are screwed together using a hexagonal nut (large) 51 and hexagonal nut (small) 52. By adopting a double nut method it is possible to screw two components together rigidly. Furthermore, in the present embodiment, a flat head bolt is used as the bolt 50. However, the bolt 50 is not limited to a flat head bolt. However, because rigid fixing is obtained and the head of the bolt 50 does not project from the installation part 33 side of the main body case 30, and because no obstacles are produced when attaching to the steel structure 2 by inserting the bolt 73 into the installation part 33 and stopping the U shaped bolt 72, a flat head bolt is preferably used. In addition, the bolt 50 passes through from the bottom part 31 side of the main body case 30. However, the bolt 50 may also pass through from the upper lid 40 side. However, the work required to tighten the nuts may become difficult when attaching to an object such as the steel structure 2, and in the present embodiment, it is preferred that the bolt 50 be passed through from the bottom part 31 side of the main body case 30.

(Operation and Function of the Tension Balancer Related to the Present Invention)

The operation and function of the power cable tension balancer when arranged on a power cable is explained below. The spring base 20 is only housed in the main body case 30, and the main body case 30 and the spring base 20 are not attached together. Therefore, the spring base 20 which is joined to the axis body 10 by brazing or welding and the main body case 30 which is screwed to the upper lid 40 with the bolt 50 and the large and small nuts 51 and 52, can move individually of each other. However, the axis body 10 which is joined to the spring base 20 passes through the upper lid 40 which is screwed to the main body case 30 while four bolts 50 which screw the main body case 30 and the upper lid 40 together pass through the spring base 20. Therefore, in the case where the spring base 20 and the main body case 30 move respectively, both slide along the bolt 50 or the axis body 10. Then, as stated above, because four groups of spring unit 60 are arranged between the spring base 20 and the upper lid 40, the four groups of spring unit 60 move while being compressed in the case where the spring base 20 and the main body case 30 each move independently or even when either of these move. In the case where both move, the four groups of spring unit 60 are more strongly compressed. As explained above, the tension applied to the power cable 3 is removed between the axis body 10 and the main body case 30 by the balance of compression of the springs of the four groups of spring units 60.

Furthermore, in the case where twisting is produced in the power cable 3 by strong winds, this twisting is transmitted to the power cable tension balancer 1. In the power cable tension balancer 1 related to one embodiment of the present invention, the axis body 10 which is latched with a hook of the insulator 5 which is connected to the power cable 3, is joined to the spring base 20 which has corners, by brazing or welding. Because the spring base 20 is housed in the main body case 30 which also has corners, even if the axis body 10 is forcibly rotated, the rotation of the axis body 10 is prevented by connecting the corners of the spring base 20 with the respective corners of the main body case 30. Furthermore, the spring base 20 is housed within the main body case 30 and because it becomes one unit with the main body case 30 and upper lid 40 using the bolts 50 which pass through the bolt through holes, 35, 23, and 43, a function of preventing rotation of the axis body 10 is demonstrated.

Figure 7:
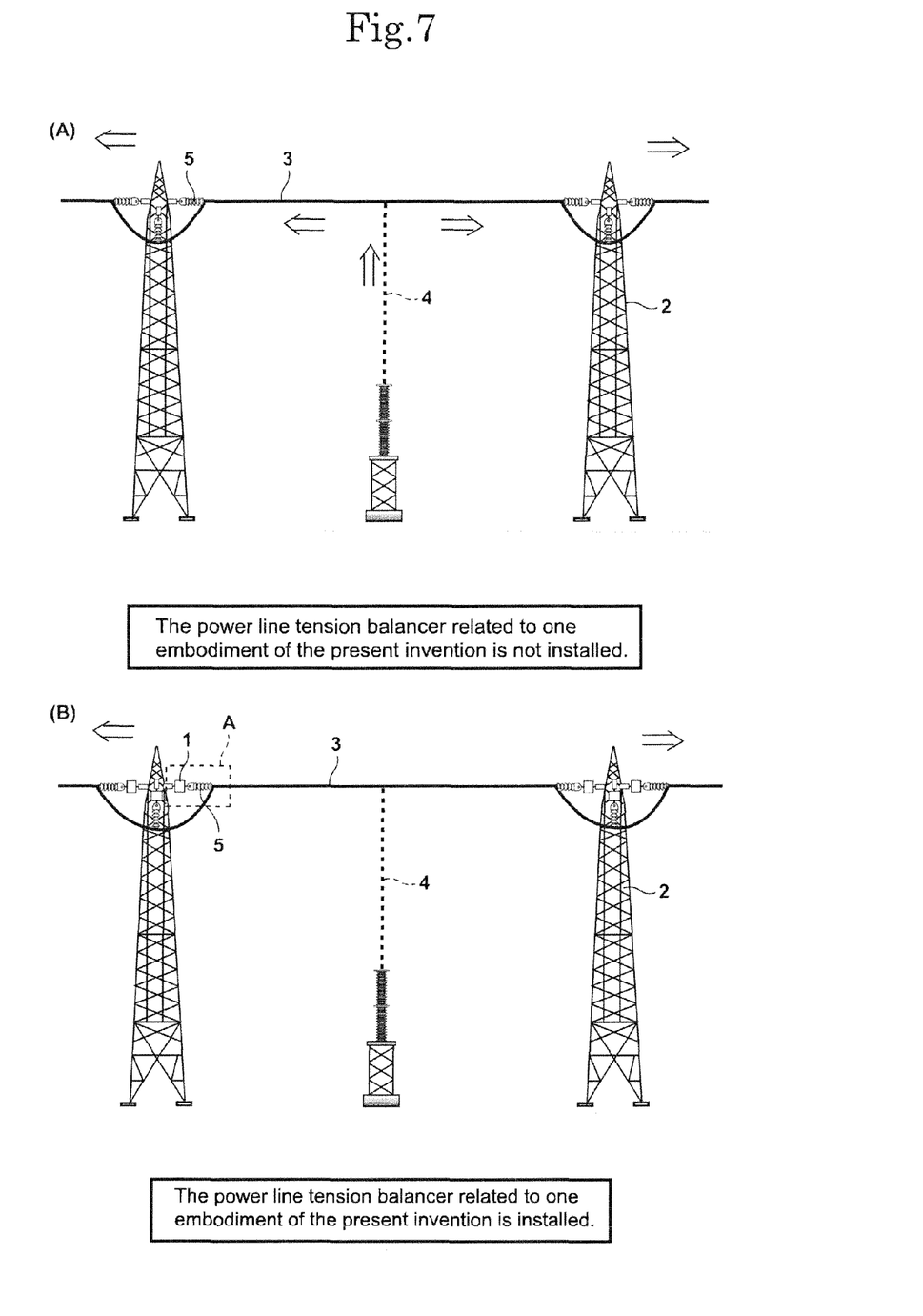
FIG. 7 is an exemplary diagram which shows the case where the power cable tension balancer related to one embodiment of the present invention is installed in a power cable of a substation facility and in the case where it is not installed in a power cable of a substation facility.
Figure 8:
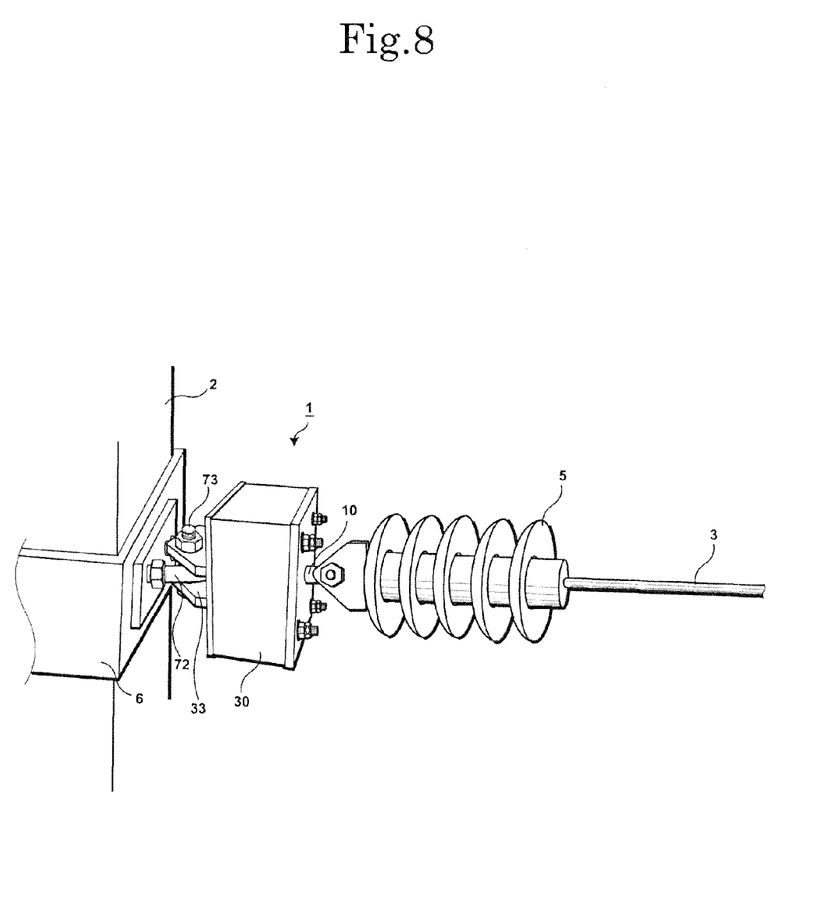
FIG. 8 is an enlarged diagram of a part A in the exemplary diagram of the setting state of the power cable tension balancer related to one embodiment of the present invention shown in FIG. 7.

Next, the mechanism of supporting tension in the case where the power cable tension balancer 1 is arranged between the steel structure 2 and the insulator 5 connected to the power cable 3 is explained while in referring to FIG. 7 and FIG. 8. FIG. 7 is an exemplary diagram which shows the case where the power cable tension balancer related to one embodiment of the present invention is not installed in a power cable of a substation facility (A) and in the case where it is installed in a power cable of a substation facility (B). FIG. 8 is an expanded view of the part A shown in FIG. 7 (B). As is shown in FIG. 7 (B), the power cable tension balancer 1 related to one embodiment of the present invention is arranged between the steel structure 2 and the insulator 5 connected to the power cable 3. More specifically, as is shown in FIG. 8, the installation part 33 of the main body case 30 of the power cable tension balancer 1 is fixed to the U shaped bolt 72 which is connected to a steel structure installation part 6 which is attached to steel structures 2 so that the U shaped bolt 72 is sandwiched between them, and the bolt 73 is inserted and screwed tight. On the other hand, a shackle of the insulator 5 which is connected to the power cable 3 is screwed and stopped by a bolt to the stopper part 12 of the axis body 10 and in this way, the power cable tension balancer 1 exists between the steel structure 2 and the power cable 3 which is connected to the insulator 5. The spring unit 60 (not shown in the diagram) is attached in a compressed state up to about a midrange position of the bolt 50 (not shown in the diagram). Therefore, at this time, a gap is produced between the case bottom part 31 (not shown in the diagram) and the spring base 20 (not shown in the diagram). The power cable tension balancer 1 is attached to the steel structure 2 by the attachment method stated above at both ends of the power cable 3.

In the case where the power cable tension balancer 1 related to one embodiment of the present invention is arranged in this way, tension is applied to the power cable tension balancer 1 attached to both ends of the power cable 3 when tension is applied to the power cable 3 by the swaying of the steel structure 2 in an earthquake. However, this tension is absorbed by the compression and stretching of the spring unit 60 within the power cable tension balancer 1 and it is possible to prevent an arrestor 4 from breaking without extra tension being applied to the power cable 3 and arrestor 4.

(Effects of the Tension Balancer Related To the Present Invention)

The effects of the power cable tension balancer 1, related to one embodiment of the present invention will be explained. As stated above, the power cable tension balancer 1 related to one embodiment of the present invention is arranged with the spring unit 60 comprised from three coils springs arranged in parallel within the main body case 30. Then, because four groups of spring unit 60 are arranged between the upper lid 40 which is screwed to the main body case 30 and the spring base 20 which is fixed to the axis body 10, a stroke of the power cable tension balancer 1 is the same as the length of the compressed spring unit 60 which is extremely short. In addition, the power cable tension balancer 1 related to one embodiment of the present invention does not have a plurality of inner pipes 103 arranged in a telescopic shape and the entire length of the power cable tension balancer 1 itself is short. Therefore, the power cable tension balancer 1 related to one embodiment of the present invention is small in scale and thus requires a small setting space. In the present embodiment, the entire length of the power cable tension balancer 1 from the axis body stopper part 12 shown in FIG. 1 up to the nut 71 on both ends of the U shaped bolt 72 connected to the installation part 33 is 185 mm which is extremely short.

In addition, because four groups of spring unit 60 are arranged, the power cable tension balancer related to one embodiment of the present invention can support a high tension. Although the power cable (bus line) 3 is elevated at a fixed tension (generally 500 kgf), the power cable tension balancer 1 related to one embodiment of the present invention can sufficiently support a high tension. In addition, left and right shaking of the steel structure 2 due in an earthquake was ±6 mm in the simulation stated above. However, when the power cable tension balancer 1 related to one embodiment of the present invention was measured by the above stated simulation with the structure mentioned above, it was judged that shaking of ±12 mm can be managed. Therefore, it is possible to prevent a break of the arrestor 4 during an earthquake.

Furthermore, it is easy to assemble the power cable tension balancer 1 related to one embodiment of the present invention and install on the steel structure 2. As stated above, the axis body 10 which passes through the upper lid 40 which includes the second housing part 41 is joined to the spring base 20 which includes the first housing part 21 by brazing or welding, the compressed spring unit 60 is arranged between the upper lid 40 and the spring base 20, and the spring unit 60 is sandwiched by the first housing part 21 and the second housing part 41. Therefore, brazing of the spring unit 60 is not necessary. Furthermore, the spring unit 60 is arranged and the spring base 20 which becomes one unit with the upper lid 40 and the axis body 10 is housed in the main body case 30, and is formed by screwing the main body case 30 and the upper lid 40 together with the bolt 50. Therefore, assembly is extremely easy. In addition, because a flat head bolt is used, the head of the bolt does not project from the side attached to the steel structure 2. Therefore, in the case of attaching to the steel structure 2, when installing the bolt 73 on the installation part 33, because the head of the bolt 50 does not become an obstacle, it can be easily installed even in a narrow space.

Furthermore, the power cable tension balancer 1 related to one embodiment of the present invention supports the tension of the power cable 3 by a flexible rebound force of the spring unit 60 which is arranged within the main body case 30. The number of coil springs which comprise the spring unit 60 can be adjusted. In addition, in the power cable tension balancer 1, the number of groups of the spring unit 60 which are arranged within the main body case 30 can also be adjusted. Therefore, by adjusting the number of coil springs which forms the spring unit 60 and the number of groups of spring unit 60 which are arranged within the power cable tension balancer 1 related to one embodiment of the present invention, it is possible to sufficiently secure the tension required by the power cable 3.

Furthermore, in the power cable tension balancer 1 related to one embodiment of the present invention, the spring base 20 is connected to the main body case 30, and the main body case 30, the spring base 20 and the upper lid 40 are screwed together by passing through the bolt 50. Therefore, even if twisting is generated in the power cable due to strong winds, it is possible to reduce this twisting by the power cable tension balancer 1. Moreover, a separate block shaped stopper or anti-rotation block is not required in order to prevent this twisting. Furthermore, the power cable tension balancer 1 related to one embodiment of the present invention is not limited to the example described above.

The tension balancer related to the present invention can be used in attaching an elevated cable which is required for supporting a high tension and can be favorably used in a train power cable as well as a power cable of a substation facility.

What is claimed is:

1. A tension balancer comprising:
    an axis body including a latch part;
    a column shaped main body including a bottom part which has at least two first through holes arranged at equal intervals in a concentric circle from the center, and an open upper part;
    a spring base housed within the main body and having an aperture for joining an end of the axis body to the center, and at least two second through holes arranged at equal intervals in a concentric circle from the center;
    an upper lid having an aperture for pushing through the main body of the axis body to the center, and at last two third through holes arranged at equal intervals in a concentric circle from the center, the upper lid being screwed to the main body by a bolt and nut which passes through the first, second and third through holes; and at least two or more spring unit groups sandwiched, between the spring base which is housed within the main body and the upper lid.

2. The tension balancer according to claim 1, wherein the spring base includes at least two concave shaped first housing parts arranged so as to include the second through hole, the upper lid including at least two concave shaped second housing parts arranged so as to include the third through hole, and one end of the spring unit being housed by the first housing part and the other end of the spring unit being housed by the second housing part.

3. The tension balancer according to claim 2, wherein the first housing part is arranged so that the second through hole is positioned at the center of the first housing part, and the second housing part is arranged so that the third through hole is positioned at the center of the second housing part.

4. The tension balancer according to claim 3, wherein a diameter of the first housing part and the second housing part is larger than an exterior diameter of the spring unit.

5. The tension balancer according to claim 1, wherein the spring base slides along the bolt while compressing the spring unit in the case where a load is applied to the axis body.

6. The tension balancer according to claim 1, wherein the axis body is joined by passing the main body of the axis body through the aperture of the upper lid and inserting an end of the axis body into an aperture of the spring base.

7. The tension balancer according to claim 6, wherein the end part of the axis body is joined to the aperture of the spring base by brazing or welding.

8. The tension balancer according to claim 1, wherein the first through hole is formed in a taper shape so that the first through hole expands from an interior direction towards the direction of the main body bottom part, and the bolt is a flat head bolt.

9. The tension balancer according to claim 1, wherein the spring unit includes m (m is a natural number of two or more) springs arranged in a nesting state, and the winding direction of adjacent strings is different respectively.

10. The tension balancer according to claim 1, wherein the main body has a cross sectional shape of n squares (n is a natural number of 3 of more) or ellipses.

11. The tension balancer according to claim 10, wherein the spring base has a cross sectional shape of n squares (n is a natural number of 3 of more) or ellipses and is housed within the main body so that it can not rotate.

12. The tension balancer according to claim 1, wherein the latch part of the axis body includes an aperture at the center, and the bottom part of the main body is arranged with an installation part which includes an aperture at the center for external connection.

13. The tension balancer according to claim 12, wherein the aperture of the latch part and the aperture of the installation part are arranged so as to be positioned in intersecting directions.

14. The tension balancer according to claim 1, wherein a diameter of the aperture of the upper lid part is larger than a diameter of the main body of the axis body and smaller than a diameter of the latch part of the axis body.

15. The tension balancer according to claim 1, wherein the main body includes a side part in which a hole is arranged at a certain position.

16. The tension balancer according to claim 1, wherein the aperture of the spring base is formed in a taper shape so that a side which faces the bottom part when the spring base is housed within the main body expands towards the bottom part.

17. The tension balancer according to claim 1, wherein the first, second and third through holes are positioned coaxially in a state in which the upper lid is screwed to the main body and the spring base is housed within the main body.

18. The tension balancer according to claim 1, wherein the same number of first housing parts and second housing parts are arranged as the number of spring units.

* * * * *